United States Patent
Hoos et al.

(10) Patent No.: US 11,872,997 B2
(45) Date of Patent: Jan. 16, 2024

(54) DEVICE FOR DECOUPLING AND PROTECTION FROM COMPENSATION CURRENTS IN A REDUNDANT SYSTEM FOR AUTONOMOUS DRIVING

(71) Applicant: Knorr-Bremse Systeme Fuer Nutzfahrzeuge GmbH, Munich (DE)

(72) Inventors: Felix Hoos, Moeglingen (DE); Thorsten Beyse, Dettingen (DE); Dieter Winz, Rottenburg (DE); Frank Scholl, Ingersheim (DE); Kai-Sven Becker, Schwieberdingen (DE); Guenter Herrmann, Stuttgart (DE); Christian Kaufmann, Sindelfingen (DE); Alexander Rammert, Kornwestheim (DE); Michael Belling, Kornwestheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 491 days.

(21) Appl. No.: 17/274,384

(22) PCT Filed: Aug. 26, 2019

(86) PCT No.: PCT/EP2019/072718
§ 371 (c)(1),
(2) Date: Mar. 8, 2021

(87) PCT Pub. No.: WO2020/052951
PCT Pub. Date: Mar. 19, 2020

(65) Prior Publication Data
US 2022/0089168 A1    Mar. 24, 2022

(30) Foreign Application Priority Data
Sep. 10, 2018 (DE) .................... 10 2018 121 960.1

(51) Int. Cl.
*B60W 50/02* (2012.01)
*B60R 16/023* (2006.01)
(Continued)

(52) U.S. Cl.
CPC ..... *B60W 50/0205* (2013.01); *B60R 16/0231* (2013.01); *B60T 17/221* (2013.01);
(Continued)

(58) Field of Classification Search
CPC ........... B60W 50/0205; B60W 50/023; B60R 16/0231; B60R 16/03; B60T 17/221;
(Continued)

(56) References Cited

U.S. PATENT DOCUMENTS 6,121,692 A * 9/2000 Michaels ............. B60R 16/027
307/9.1
6,121,693 A    9/2000 Rock
(Continued)

FOREIGN PATENT DOCUMENTS

| CN | 103660954 A | 3/2014 |
| CN | 103661401 A | 3/2014 |

(Continued)

OTHER PUBLICATIONS

International Search Report for PCT/EP2019/072718 dated Oct. 29, 2019.
(Continued)

*Primary Examiner* — Muhammad Shafi
(74) *Attorney, Agent, or Firm* — NORTON ROSE FULBRIGHT US LLP; Gerard A. Messina

(57) ABSTRACT

A device for decoupling and/or protecting against compensation currents when at least one electric actuator is used jointly by a plurality of independently voltage-supplied control unit devices in redundant systems for autonomous driving. The electric actuator has, in each case, a common
(Continued)

connection, via which the electric actuator can be coupled and switched to a common connection of other electrical actuators, and has at least one dedicated connection via which the at least one electric actuator can be individually supplied with current. A number of switching devices corresponding to the common connection and the number of dedicated connections of all the electric actuators is arranged to apply or not apply a switched current in the at least one electric actuator. Provided is at least one current flow blocking device configured to prevent an unwanted current flow to a non-active electronic control unit of the first and second control unit devices.

14 Claims, 13 Drawing Sheets

(51) Int. Cl.
| | |
|---|---|
| B60T 17/22 | (2006.01) |
| B60W 50/023 | (2012.01) |
| H02J 1/10 | (2006.01) |
| H02J 7/00 | (2006.01) |
| H02J 7/14 | (2006.01) |
| H02J 9/06 | (2006.01) |
| H02M 3/07 | (2006.01) |

(52) U.S. Cl.
CPC .......... B60W 50/023 (2013.01); H02J 1/108 (2013.01); H02J 7/0031 (2013.01); H02J 7/0034 (2013.01); H02J 7/1423 (2013.01); H02J 9/06 (2013.01); *B60T 2270/402* (2013.01); *B60T 2270/413* (2013.01); *B60T 2270/414* (2013.01); *B60T 2270/415* (2013.01); *H02J 2310/40* (2020.01); *H02M 3/07* (2013.01)

(58) Field of Classification Search
CPC ......... B60T 2270/402; B60T 2270/413; B60T 2270/414; B60T 2270/415; H02J 1/108; H02J 7/0031; H02J 7/0034; H02J 7/1423; H02J 9/06; H02J 2310/40; H02M 3/07; B60L 3/0076; B60L 3/0092; B60L 2260/32
USPC ....................................................... 701/29.2
See application file for complete search history.

(56) References Cited

U.S. PATENT DOCUMENTS

| | | | | |
|---|---|---|---|---|
| 10,160,411 | B2* | 12/2018 | Fassnacht | ............. B60R 21/017 |
| 2001/0035679 | A1* | 11/2001 | Riddiford | ............... G01L 5/225 |
| | | | | 303/DIG. 9 |
| 2005/0035656 | A1* | 2/2005 | Kuramochi | ........... H02J 7/1423 |
| | | | | 307/10.1 |
| 2015/0158499 | A1* | 6/2015 | Koravadi | ............. B62D 15/029 |
| | | | | 701/1 |
| 2017/0033596 | A1 | 2/2017 | Brooks | |

FOREIGN PATENT DOCUMENTS

| | | | | |
|---|---|---|---|---|
| CN | 104632926 A | | 5/2015 | |
| CN | 107000726 A | | 8/2017 | |
| CN | 108437914 A | * | 8/2018 | ......... B60R 16/0238 |
| DE | 3624455 A1 | | 1/1988 | |
| DE | 19913131 A1 | | 10/2000 | |
| DE | 10150379 A1 | | 4/2003 | |
| DE | 10348162 B3 | | 1/2005 | |
| DE | 102005004330 A1 | | 8/2006 | |
| DE | 102005062907 B3 | | 5/2007 | |
| DE | 102008009043 B3 | | 5/2009 | |
| DE | 102009037641 A1 | | 2/2011 | |
| DE | 102015104104 A1 | * | 10/2015 | .......... B60L 11/1853 |
| DE | 102014208192 A1 | | 11/2015 | |
| DE | 102015010323 A1 | | 6/2016 | |
| DE | 102015200124 A1 | | 7/2016 | |
| DE | 102016200086 A1 | | 7/2017 | |
| DE | 102016002676 A1 | | 9/2017 | |
| EP | 1077525 A2 | | 2/2001 | |
| EP | 1175324 A1 | | 1/2002 | |
| EP | 1478072 | * | 11/2004 | |
| EP | 1478072 A2 | | 11/2004 | |
| EP | 2384922 A2 | | 11/2011 | |
| EP | 3197725 A1 | | 8/2017 | |
| EP | 3318458 A1 | | 5/2018 | |
| WO | 0128804 A1 | | 4/2001 | |
| WO | 2014187634 A2 | | 11/2014 | |

OTHER PUBLICATIONS

Christine Ross et al. "Turboelectric Distributed Propulsion Protection System Design Trades" SAE Technical Paperseries.US. vol. 1, Sep. 16, 2014. Retrieved from the Interneton Mar. 4, 2021: https://strathprints.strath.ac.uk/55026/1/Ross_etal_SAE2014_turboelectric_distributed_propulsion_protection_system_design_trades.pdf. 14 Pages.

* cited by examiner

DEVICE FOR DECOUPLING AND PROTECTION FROM COMPENSATION CURRENTS IN A REDUNDANT SYSTEM FOR AUTONOMOUS DRIVING

FIELD OF THE INVENTION

The present invention is based on a device for decoupling and protection from compensation currents in a redundant system for autonomous driving.

BACKGROUND INFORMATION

In highly automated or autonomously driven vehicles, such as highly automated or autonomously driven commercial vehicles, driver assistance systems instead of the driver control the vehicle and also monitor the vehicle's surroundings. Driver assistance systems are classified according to SAE in six levels (0 to 5). In particular in the case of vehicles which perform autonomous driving functions at least temporarily without a driver who is in a position to intervene at all times (in the case of assistance functions from level 3, which relates to highly automated driving, an underlying system assumes the longitudinal and transverse guidance in a specific application, detects system limits and prompts a driver to take over with sufficient time in reserve. The driver no longer needs to permanently monitor the vehicle or system, but potentially be able to take control), brake systems must still be able to control actuators such as pressure control valves (PCVs) even in the event of a fault in an electrical control circuit, in order to still perform electrically controlled functions, such as ABS, ESP, steering brake and the like, even in the event of a fault. However, in the event of a fault, for example a component failure, it may still be the case that the driver can no longer intervene and assume control of the vehicle, or at least no longer sufficiently quickly. For this reason, the function must be taken over immediately by a backup control unit. Therefore, safety-critical electronic systems are configured redundantly.

For safety reasons, critical electronic systems are therefore configured redundantly. For example, a redundancy of a voltage supply is ensured via multiple, for example two, independent voltage sources, which usually share a common ground, or else vehicles are fitted with multiple, for example two, independent electrical control circuits with a common ground (vehicle ground) for braking control.

In a compressed-air braking system, this applies in particular to the electronics of the braking system (i.e. the control units) as well as to the control of electro-pneumatic actuators, e.g. solenoid valves or pressure control valves. Whereas in a known system the electronics are configured redundantly by two separate control units, in many electro-pneumatic valves it is sufficient to connect one valve jointly to two redundant brake system control units and to control such valves by one or the other control unit depending on the situation.

FIG. 1 shows a schematic detail of a structure of a system having two brake control units, one of which is a main brake control unit and the second is a backup brake control unit, which jointly access coils of solenoid valves. The coils are controlled by semiconductor drivers or semiconductor switches, all of which are supplied via a common supply and ground path. Line fuses are indicated schematically.

A disadvantage of the arrangement is that, due to the connection via the contacts of the common solenoid valves, compensation currents can occur between the two voltage supplies. Such compensation currents are caused by voltage differences between the voltage supplies or a ground offset (normally the GND1 and GND2 are the same, but under certain circumstances, ground offsets can occur, i.e. a voltage difference between the ground inputs). The current flow then takes place via switched MOSFETs in one control unit and the inverse diode or body diode of the MOSFET in the other control unit.

FIG. 2 illustrates an example of the occurrence of compensation currents in such a system with jointly used solenoid valves without further protective measures. In FIG. 2, for example, a solid line schematically indicates a desired current flow, and broken lines indicate possible compensation currents.

In addition, if there are multiple independent control circuits present for the brake control, it must be ensured that a fault in one of the control circuits does not adversely affect another control circuit. In particular, a single fault must not lead to a simultaneous failure of all, for example both, control circuits.

In an arrangement, for example, a pressure control valve consists electrically of two solenoid valves, each with a common connection and a dedicated connection. A controlling electronic control unit has a switch with which the common connections of all solenoid valves can be switched, and a dedicated switch for each of the solenoid valves to be able to supply them with current individually.

The switches can be configured as electronic output stages controlled by a logic unit of the electronic control unit. Here, a distinction is made between output stages which connect the supply leads of the solenoid valves to a positive (+) potential (high side), and output stages which connect the return leads of the solenoid valves to a negative (−) or ground potential (low side). The output stage that jointly switches one of the two paths for a plurality of solenoid valves can be a high-side or low-side output stage (common ground). To simplify matters, a negative or low-side connection is assumed in the following. A two-sided shutdown option is required to prevent unwanted supply of current to a solenoid valve even in the event of a short-circuit in one of the supply leads to the supply or to ground, or due to a short-circuited ("fused") output stage, i.e. one that is short-circuited (having a short-circuit fault) between drain and source due to excess temperature and thus destroyed.

In order to detect other faults in a timely manner, in particular short-circuits between a supply and a return lead, between a return lead and the supply and between the return lead and ground, as well as cable breakage, electrical values (voltages at the terminals, excessive currents) are usually permanently monitored and from time to time test pulses are applied to the magnets and the electrical response to them is evaluated.

If a pressure control valve is controlled by two or more electronic control units, however, when one of the electronic control units applies test pulses to a magnet, the permanent monitoring in another electronic control unit would respond and incorrectly detect a fault. In addition, if two electrical circuits have a common ground (−), a ground offset between two controlling electronic control units can result in the destruction of one or both of the electronic control units. Furthermore, a defective electronic control unit may be unintentionally supplied "backwards" if it has been disconnected from its supply voltage due to a fault, for example, or, if the faulty electronic control unit has a short circuit from its supply to ground, a current flowing to the solenoid from an intact electronic control unit can then be short-circuited, because the parasitic diode of the high-side output stage of the faulty electronic control unit allows the current from the intact electronic control unit to pass through when this second electronic control unit turns on the solenoid valve. This could lead to unwanted and potentially hazardous actions of the first, faulty electronic control unit and/or prevent the solenoid valve of the pressure control valve in question from switching, or due to the excessive current flow, also destroy the second electronic control unit, thereby eliminating the required redundancy.

If an output stage for the individual supply of current to a solenoid valve in an electronic control unit is short-circuited, it is not sufficient that only this electronic control unit switches off the corresponding opposite-polarity, common output stage, since in this case, the current would flow through the opposite-polarity, common output stage of the other electronic control unit and activate the solenoid valve unintentionally.

SUMMARY OF THE INVENTION

Based on the above-mentioned set of problems, an object of the present invention is to prevent compensation currents between voltage supplies via the control units in a compressed-air braking system with redundant control units jointly using solenoid valves, including those without galvanic isolation and in compliance with safety requirements. In addition, the invention is intended to ensure that a fault in a control circuit in a compressed-air braking system does not affect another control circuit.

This object may be achieved according to the invention by the features as described herein.

The invention is based on a device for decoupling and protection against compensation currents when electric actuators are shared by two independently voltage-supplied control units in redundant systems for autonomous driving. In a modular approach, the invention includes circuit modules (A and B), which can be added to conventional control units and which, in combination with control units, provide protection against compensation currents and feedback effects due to shared usage.

The device for decoupling and protection from compensation currents comprises two modules (semiconductor switching modules) and/or diodes, or functionally equivalent elements or components, which as current blocking devices are configured to be connected into the positive and ground paths, and which enable the prevention of compensation currents and other unwanted currents between voltage supplies via control devices, even without galvanic isolation and in compliance with safety requirements.

The modules may be configured as switching devices or switches, which are inserted directly into the supply path or the ground path. The modules are operated via a plurality of control lines. When all control lines are activated, the modules act as closed switches. Otherwise, the modules behave like open switches, wherein the internal circuit arrangement of the modules provides the aforementioned protection functions.

The modules can also be implemented in different configuration levels, which are configurable for the respective safety requirements. For example, the modules can be configured to meet simpler to enhanced safety requirements, such as a predetermined tolerance to individual short circuits of internal MOSFETs or short circuits in downstream high-side or low-side solenoid valve drivers. In addition, the modules may also provide a tap-off for circuit parts that are not shared and only require protection against polarity reversal of the control unit supply voltage.

The device according to the invention for decoupling and/or protection from compensation currents for use when at least one electric actuator is shared by a plurality of independently voltage-supplied control unit devices in redundant systems for autonomous driving provides that the at least one electric actuator has, in each case, a common connection via which the electric actuator can be coupled and switched to a common connection of other electric actuators, and has at least one dedicated connection, via which the at least one electric actuator can be individually supplied with current; the plurality of control unit devices has at least one first control unit device comprising a first electronic control unit and a first number of switching devices corresponding to the common connection and the number of dedicated connections of all the electric actuators, and has at least one second control unit device comprising a second electronic control unit and a second number of switching devices corresponding to the common connection and the number of dedicated connections of all the electric actuators, and the at least one first and second control unit devices are arranged to apply or not apply a switched current to the at least one electric actuator using said switching devices. At least one current flow blocking device is configured to prevent a resulting flow of current to the electronic control unit of another of the first and second control unit devices when one of the first and second control unit devices applies a switched current to the at least one electric actuator.

The features according to the invention as described above, in particular, advantageously prevent a voltage offset or a ground offset from causing an undesirable current flow between control units and/or electronic control devices in a redundantly configured system, such as a braking system, for autonomous driving, which in turn advantageously prevents one or all of the electronic control units from being damaged or destroyed due to the unwanted current flow, or a defective electronic control unit from again being unintentionally supplied "backwards" if, for example, it is disconnected from its supply voltage due to a fault, or the current from an intact electronic control unit from being short-circuited to a solenoid valve if a faulty electronic control unit has a short circuit from its supply to ground or a short circuit from its ground to the supply voltage. An overall advantage of the features according to the invention is that the redundancy required for the autonomous system can also be maintained in the event of a fault or in the event of unsuitable voltage and/or ground conditions.

The measures specified herein enable advantageous extensions and improvements to the invention specified in the main description herein.

The first and second control unit devices comprise a main brake control unit with the first electronic control unit and a backup brake control unit with the second electronic control unit, and the at least one electric actuator comprises a solenoid valve or a pressure control module containing solenoid valves, wherein the first and second control unit devices are arranged to jointly access coils of the solenoid valves and of the pressure control modules, the coils being configured to be activated via the switching devices, and wherein the switching devices contain semi-conductor switches configured to be supplied via a common supply and ground path.

It also may be provided that the switching devices are configured as electronic output stages, which are arranged to be controlled by a logic unit of the first or second electronic control unit, one output stage in each case being an output stage that connects the supply leads of an electric actuator to a positive potential, or an output stage that connects the return leads of the electric actuator to a negative potential or ground potential.

It particularly may be that the current flow blocking device is configured as a first compensation current protection module and a second compensation current protection module, which are each configured as a switching semiconductor circuit module and configured to be connected into a positive path and a ground path and to prevent compensation currents between voltage supplies through the control unit devices.

It also may be that the first compensation current protection module has one input, three separate control inputs for controlling internal control switches in a MOSFET gate controller of switching MOSFETs provided in the module, a fully protected output, an output providing reverse-polarity protection, a ground connection as well as a charge pump, wherein the gate control leads are configured to be decoupled from each other to protect against failures due to individual short-circuit faults of the MOSFETs.

It also particularly may be that the second compensation current protection module has one input, three separate control inputs for controlling internal control switches in a MOSFET gate controller of switching MOSFETs provided in the module, a fully protected output, an output providing reverse-polarity protection and a ground connection, wherein the gate control lines are decoupled from each other to protect against failures due to individual short-circuit faults of the MOSFETs.

It is advantageously provided that in the first and second compensation current protection modules the orientation of the MOSFETs is determined module-internally by the orientation of the MOSFETs in downstream high-side and low-side drivers of drivers for the at least one electric actuator, and the interconnection of the MOSFETs of the first and second compensation current protection modules is such that two body diodes of two respective MOSFETs are connected in opposite directions and provide direct protection against reverse currents, and a third MOSFET of the first and second compensation current protection modules is oriented in such a way that it provides a redundant reverse current protection.

More particularly, the current flow blocking device can be configured as a diode arranged on a terminal of each of the switching devices.

In this case, the diode may be located within the first and second control units or outside the first and second control units.

In this case, it may be alternatively that a plurality of diodes are arranged in a diode circuit arrangement forming a T-piece, which operates equivalent to a single diode.

Alternatively again, in this case it may be that a diode is arranged in a common current path section between the switching devices and each of the electronic control units as a current flow blocking device.

Alternatively again, in this case it can be that on the supply-potential side a reverse-polarized and actively switched output stage is arranged in a common current path section between the switching devices and the first and second electronic control unit as the current blocking device, and on the ground-potential side a diode is arranged in a common current path section between the switching devices and the first and second electronic control unit as the current blocking device.

As a further alternative device, in this case it can be that on the supply-potential side a reverse-polarized and actively switched output stage is arranged in a common current path section between the switching devices and the first and second electronic control unit as the current blocking device, and on the ground-potential side a reverse-polarized and actively switched output stage is arranged in a common current path section between the switching devices and the first and second electronic control unit as the current blocking device.

Furthermore, it may be advantageous in the device that the first and second electronic control units are configured to block both the switching devices of a positive and a ground line if no electric actuator is to be supplied with current; in a fault-free operation in accordance with predetermined criteria, that specifically only one of the first and second electronic control units performs the control of the at least one electric actuator; an electronic control unit of the first and second electronic control units in a passive state is configured not to carry out an active supply of current to an electric actuator for testing purposes; and that the electronic control unit in the passive state is configured to switch to an active state in the event of a fault in an active control unit of the first and second electronic control units which prevents further operation of the active control unit, and as a new active electronic control unit to assume the control of the electric actuator instead of the faulty electronic control unit from then on; wherein the electronic control unit in the passive state is configured to monitor voltage levels and/or current levels on its leads to the at least one electric actuator, to plausibility-check this monitoring with information transmitted to it by the active electronic control unit regarding a current activation of the at least one electric actuator, and to monitor a safe blocking of the current blocking device.

The invention relates not only to the device described above for decoupling and protection from compensation currents in a redundant system for autonomous driving, but also to a method for controlling and/or operating such a device. As mentioned above, a braking system in which the device can be installed and the method can be carried out can be operated electrically, hydraulically, pneumatically, electro-hydraulically or electro-pneumatically. The braking system may be a braking system of a passenger car or a commercial vehicle (towing vehicle and/or trailer) and may be of any kind and in particular may be operated electrically, hydraulically, pneumatically, electro-hydraulically or electro-pneumatically. In this respect, the invention extends to cover all types of vehicles, including in particular passenger vehicles, commercial vehicles or heavy goods vehicles.

The control unit device can be formed by a separate control unit or by an existing electronic control unit, in particular by a vehicle control unit, a brake control unit of the braking device, or by the control unit of an electro-pneumatic brake control module.

Advantageous extensions of the invention are derived from the patent claims, the description and the drawings. The advantages of features and combinations of several features mentioned in the introduction are only exemplary and may have an alternative or cumulative effect without the advantages necessarily having to be obtain from embodiments according to the invention.

Further features can be found in the drawings—in particular illustrated geometries and relationships of several components to each other as well as their relative arrangement and effective connection. The combination of features of different embodiments of the invention or of features of different patent claims is also possible in deviation from the chosen cross references of the patent claims and is thereby encouraged. This also applies to those features which are shown in separate drawings or are mentioned in their description. These features can also be combined with features of different patent claims. Likewise, the features listed in the patent claims may be omitted for other embodiments of the invention.

Identical or identically acting components and assemblies are identified with the same reference numbers in different embodiments.

Below, exemplary embodiments of the invention is illustrated in the drawing and discussed in more detail in the following description. It is noted that the drawing represents, schematically and in the form of a detail, parts of a compressed-air braking system (an air-brake system) for vehicles known per se, such as those used in commercial vehicles. Therefore, for convenience the components of the compressed-air braking system or the air-brake system are only referred to insofar as their description and explanation contribute to a better understanding of the invention. In addition, for reasons of clarity, identical or at least similar components are not identified repeatedly in the drawing with the same reference numbers, but a reference number can be indicated once as an example and representative of such identical or at least similar components.

DETAILED DESCRIPTION

First Exemplary Embodiment

Figure 1:
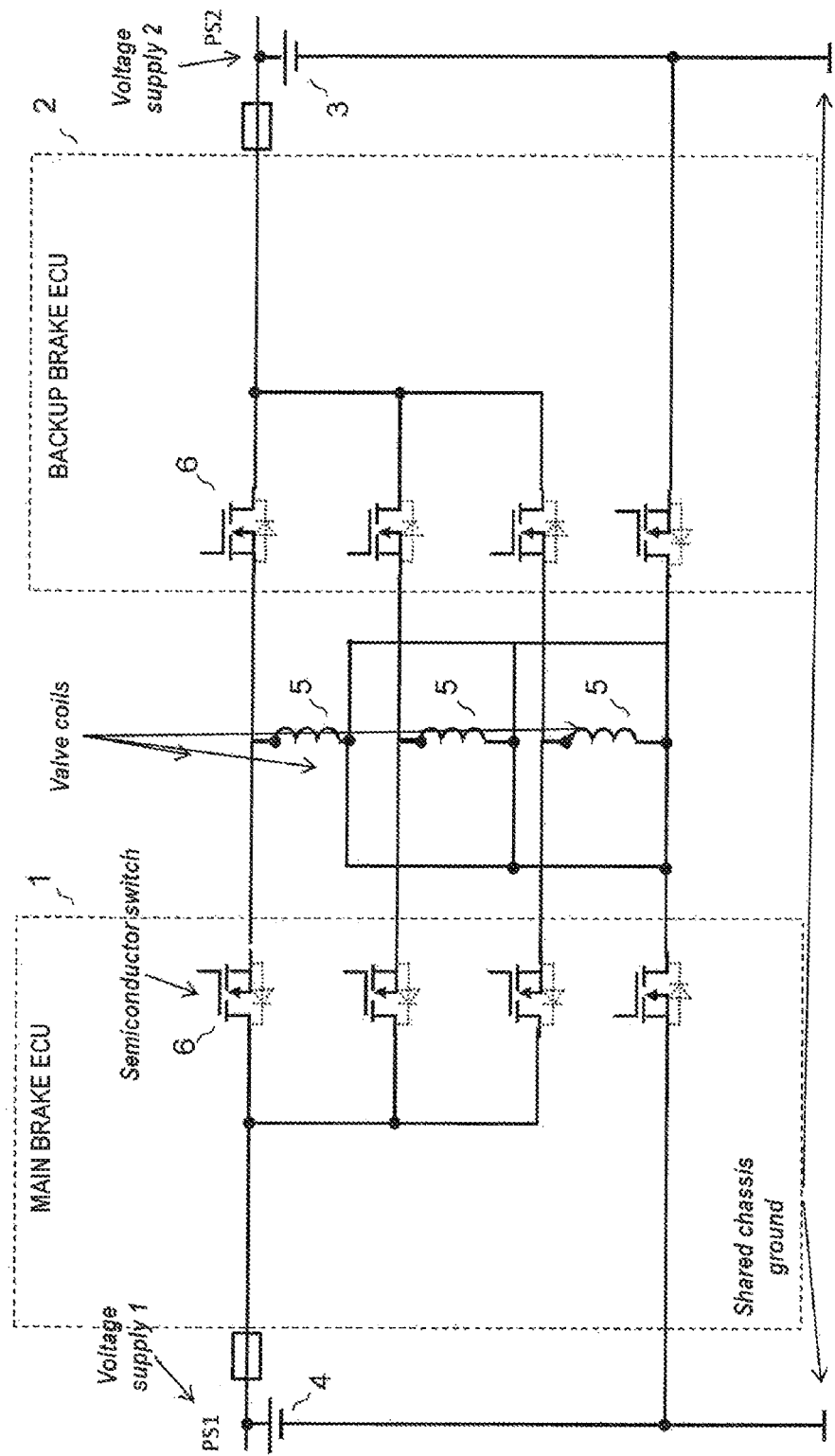
FIG. 1 shows a schematic structure of a part of a redundantly configured compressed-air braking system with two control units, more precisely a main control unit and a backup control unit, as well as a plurality of solenoid valves used jointly by the two control units.

FIG. 1 shows a schematic structure of a part of a redundant air brake system for, for example, a vehicle having a plurality of control unit devices, here at least two control units and more precisely a main control unit (first control unit) 1 and a backup control unit (second control unit) 2, as well as a plurality, for example, a first, a second and a third, of solenoid valves 5 used jointly by the two control units 1, 2.

Each pin of the solenoid valves 5 is connected to both the main control unit 1 and the backup control unit 2. The main control unit 1 is supplied with a predetermined potential relative to a chassis ground by a first voltage supply 4, and the backup control unit 2 is supplied with the predetermined potential relative to the chassis ground by a second voltage supply 3. The main and backup control units 1, 2 are arranged and configured to switch switching devices 6, each located in the supply path and in the ground path, for example suitable MOSFETs or otherwise suitable circuit breakers or output stages, as switches as required.

In the example braking scheme shown in FIG. 1, the first control unit 1, i.e. the main control unit, can contain a first electronic control unit or ECU (not shown in FIG. 1), which may belong to a "standard" EBS system or electronic braking system, and can contain the second control unit 2, i.e. the backup control unit, a second electronic control unit or ECU (not shown in FIG. 1), which controls a backup brake control unit with an arrangement/structure of redundant braking as a backup system. The two electronic control units in the two control units 1, 2 are connected to each of the voltage supplies 3, 4 and can communicate with each other and with other vehicle systems via a data bus (not shown). The control units 1 and 2 taken as a whole each form control unit devices.

It goes without saying that the part of a compressed-air braking system shown in FIG. 1 may be part of a braking system of any type of vehicle, such as a commercial vehicle in the form of a towing vehicle and/or a trailer thereof, and the compressed-air braking system can be of a known kind and in particular can be operated electrically, hydraulically, pneumatically, electro-hydraulically or electro-pneumatically. It also goes without saying that the number, configuration and arrangement of the control units 1, 2, the solenoid valves 5 and the switches 6 is not limited to the number, configuration and arrangement used in this example, provided the effects and advantages according to the invention can be achieved in an appropriate number, configuration and arrangement. Details of the compressed-air braking system known per se are omitted in the following description for simplicity, unless they contribute to a better or easier understanding of the invention.

Figure 2:
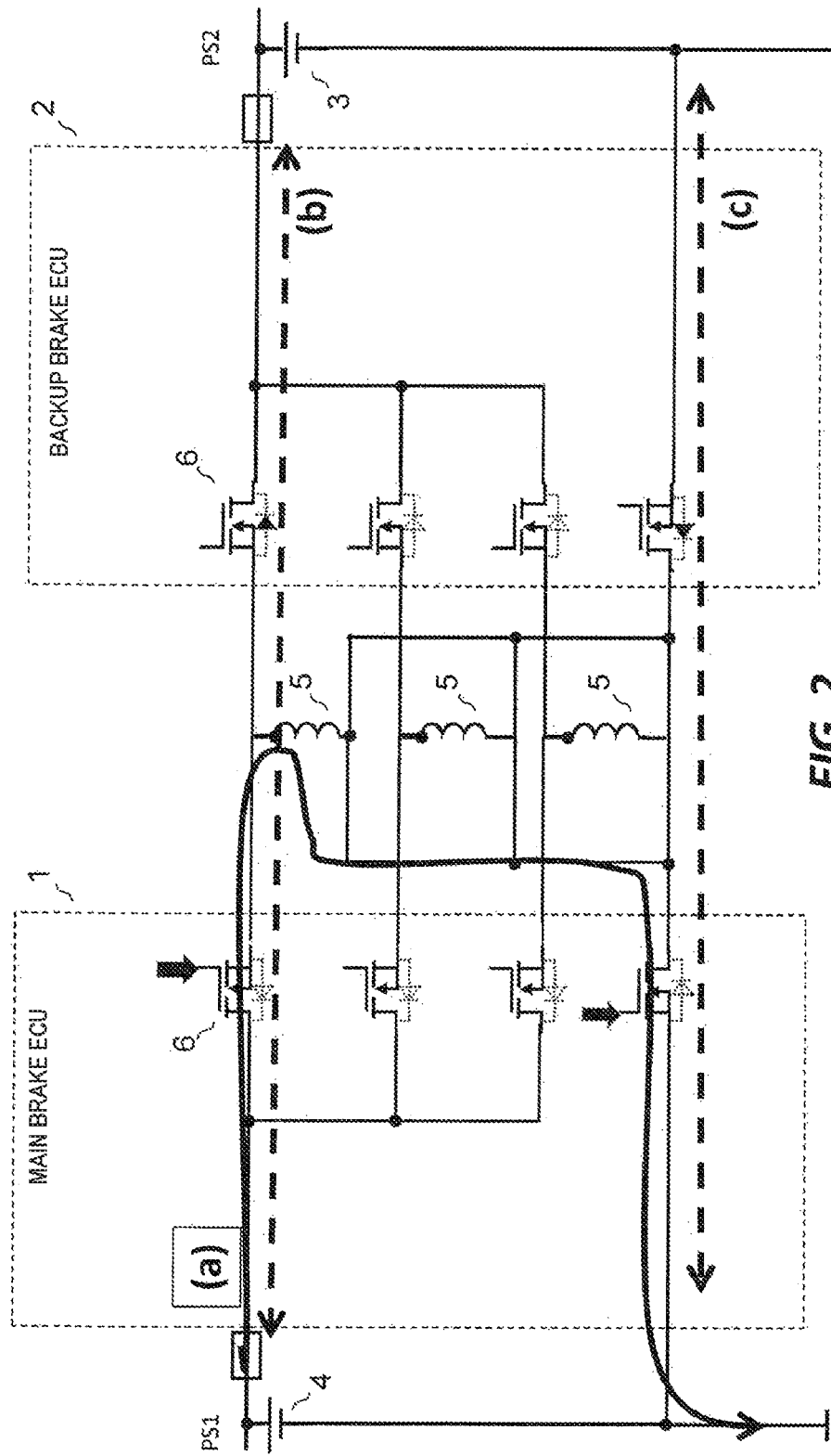
FIG. 2 shows examples of compensation currents between voltage supplies shown in FIG. 1 (solid line: desired current flow, broken lines: possible compensation currents).

FIG. 2 shows examples of compensation currents that can occur between the voltage supplies 3 and 4 shown in FIG. 1. As soon as one of the control units 1, 2 closes at least one of the switches 6 in the supply and ground paths and a correspondingly predetermined current (a) flows, in situations where, in each case in the forward direction of the body diode, a voltage difference exists between the first voltage supply 4 and the second voltage supply 3 (case (b)) or a ground offset exists between the ground pins of the two control units 1, 2 (case (c)), compensation currents (b), (c) flow in the other control unit through the body diodes of the MOSFETs forming the switches 6.

Figure 3:
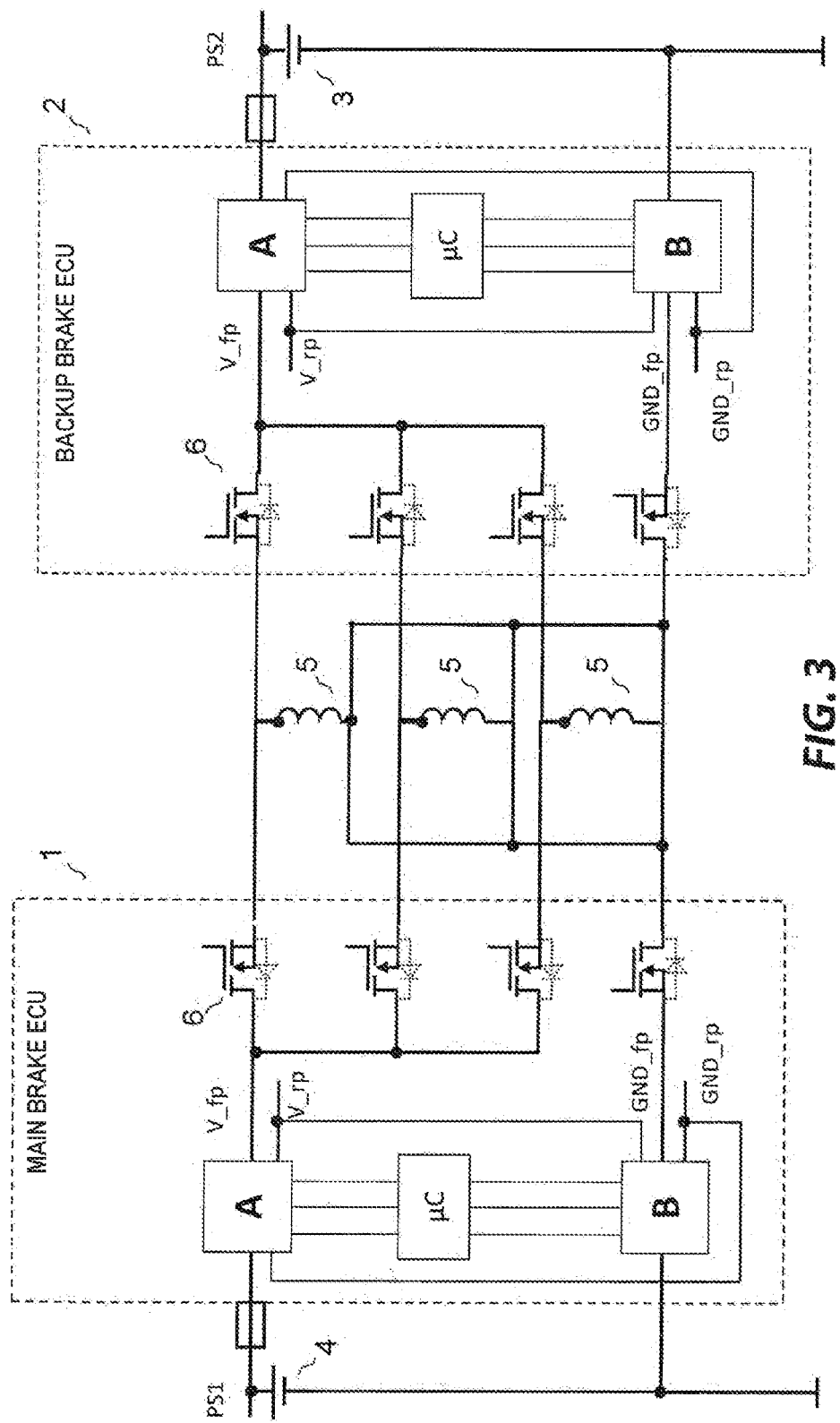
FIG. 3 shows the part of a redundant compressed-air braking system shown in FIG. 1, in which, according to an exemplary embodiment, a first compensation current module A is arranged in a positive supply path and a second compensation current module B is arranged in the ground supply paths for protection from compensation currents between the independent voltage supplies.

FIG. 3 shows the part of the redundant air brake system shown in FIG. 1, and shows the overall structure of such a system. The following FIGS. 4 to 8, based on FIG. 3, show the circuit details of the two modules A, B for the positive supply path (A) and the ground path (B) in different configuration levels.

As illustrated in FIG. 3, according to an exemplary embodiment a first compensation current module A is arranged in a positive supply path and a second compensation current module B is arranged in the ground supply paths to provide protection from compensation currents between the independent voltage supplies 3, 4. According to FIG. 3, in this exemplary embodiment the compensation current protection modules A, B may be integrated in the control units 1, 2. It therefore goes without saying that a configured number of compensation current protection modules corresponds to a configured number of control units.

Figure 4:
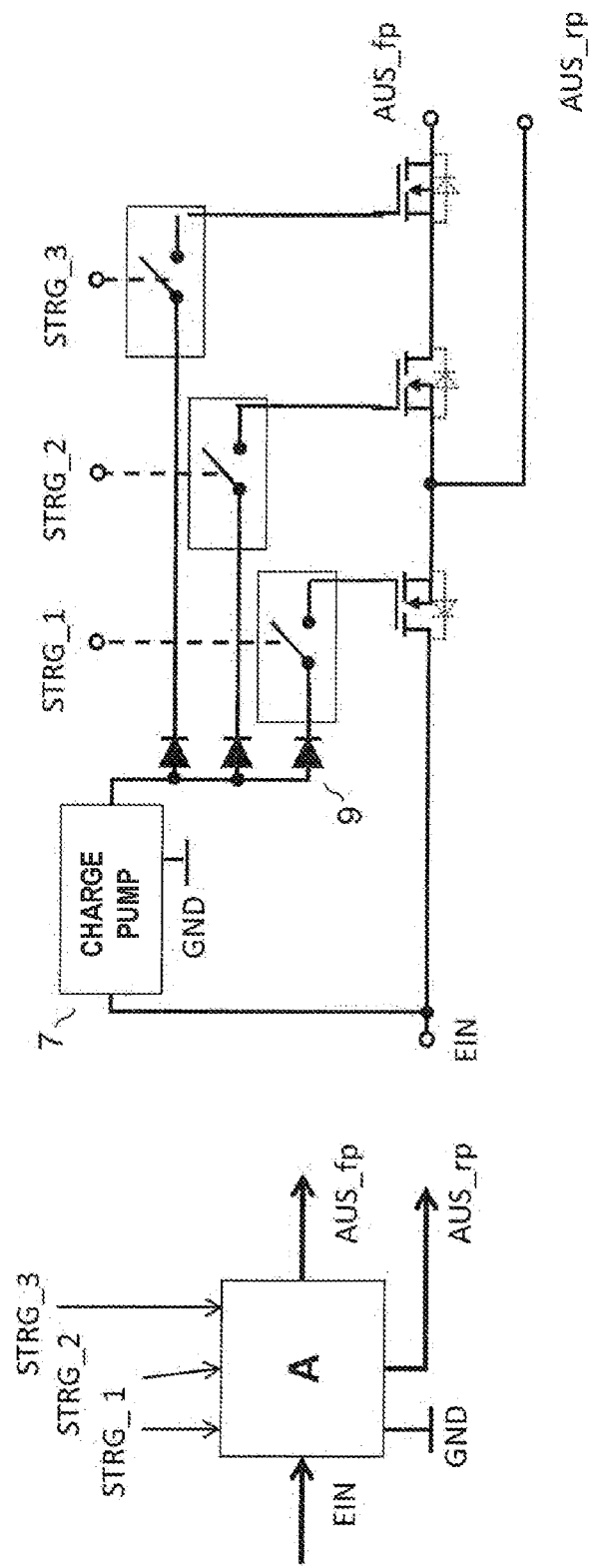
FIG. 4 shows details of the exemplary first compensation current protection module A according to FIG. 3 for protection against compensation currents in the positive supply path.

FIG. 4 shows details of an example of a first compensation current protection module A according to FIG. 3 for protection against compensation currents in the positive supply path, and as such shows a basic variant of both modules A and B.

More precisely, the first compensation current protection module A shown in FIG. 4 has one input EIN, three separate control inputs for activating internal control switches (designated as STRG_1, STRG_2 and STRG_3) in this exemplary embodiment, for example, in a MOSFET gate controller, a fully protected output AUS_fp, an output AUS_rp providing only reverse polarity protection, a ground connection GND, and a charge pump 7. The gate control lines may be decoupled from each other to protect against failures due to individual short-circuit faults in the MOSFETs. A suitable decoupling is indicated in FIG. 4 by a diode 9 in each of the individual gate control lines and the MOSFETs controlled separately by the three inputs STRG_1, STRG_2 and STRG_3. It is noted that the diode 9 can be optionally arranged. For example, when bipolar transistors or MOSFETs are used for STRG_1, STRG_2 and STRG_3, they are not required.

Figure 5:
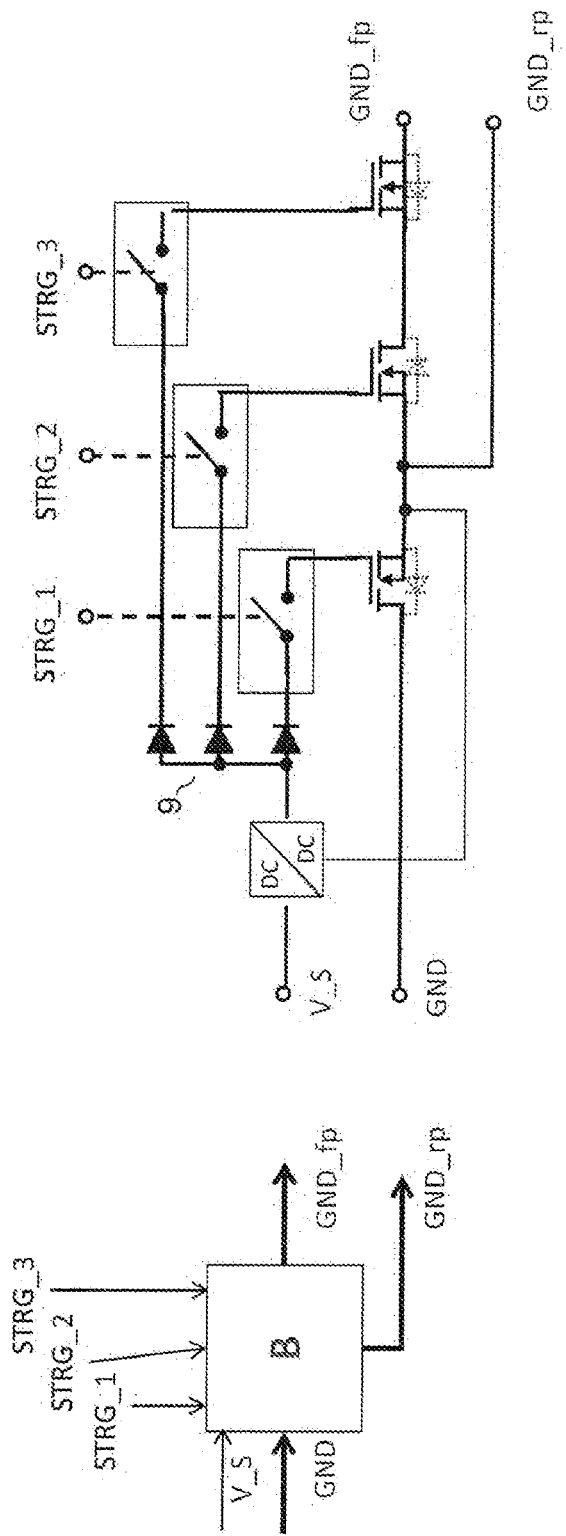
FIG. 5 shows details of the exemplary second compensation current protection module B according to FIG. 3 for protection against ground compensation currents.

FIG. 5 shows details of the exemplary second compensation current protection module B according to FIG. 3 for protection against ground compensation currents.

The second compensation current protection module B shown in FIG. 5 has one input EIN, three separate control inputs for activating internal control switches (designated as STRG_1, STRG_2 and STRG_3) in this exemplary embodiment, for example, in a MOSFET gate controller, a fully protected output GND_fp, an output GND_rp providing only reverse polarity protection, and a ground connection GND. The gate control lines may be decoupled from each other to protect against failures due to individual short-circuit faults in the MOSFETs. A suitable decoupling is indicated in FIG. 5 by a diode 9 in each of the individual gate control lines and the MOSFETs controlled separately by the three inputs STRG_1, STRG_2 and STRG_3. It is noted that the diode 9 can be optionally arranged. For example, when bipolar transistors or MOSFETs are used for STRG_1, STRG_2 and STRG_3, they are not required.

In this basic variant, the first and second compensation current protection modules A and B, when they are in the state of an open switch, provide reverse polarity protection and protection from compensation currents that is tolerant to individual MOSFET short-circuit faults.

The circuit arrangements of the first and second compensation current protection modules A and B according to FIG. 4 are each based on three power MOSFETs. An important design criterion here is the orientation of the power MOSFETs, wherein the module-internal orientation is determined by the orientation of the power MOSFETs in downstream high-side and low-side drivers of drivers for the solenoid valves. A design objective is to interconnect the power MOSFETs of the first and second compensation current protection modules A and B in such a way that two body diodes of the power MOSFETs are connected in opposite directions and provide direct protection against reverse currents. The third power MOSFET of the first and second compensation current protection modules A and B is oriented in such a way that in conjunction with the high-side or low-side driver for the solenoid valve control output it provides a redundant reverse current protection. This ensures that the protection against compensation currents is not lost due to a single short circuit of a power MOSFET. In addition to the choice of the orientation of the MOSFETs, various combinations of the sequence of the power MOSFETs are also possible depending on the desired circuit characteristics, which can be determined by testing and/or monitoring circuits, for example.

The internal control of the power MOSFETs in the first and second compensation current protection modules A and B is indicated schematically in FIG. 4 by switch modules and by the charge pump 7 (first compensation current protection module A) or a voltage transformer (DC/DC in the second compensation current protection module B). Technically, the switching voltage for the power MOSFETs can be achieved, for example, by switching the gate source voltage by a bipolar transistor circuit. A sufficiently high gate source voltage for the power MOSFETs can be generated in the first compensation current protection module A, for example, via one or more charge pumps, depending on the safety requirements. However, there is no limitation to this and other implementations are also conceivable. Parts of the charge pump, e.g. the generation of the high-frequency control signal, can also be relocated externally and provided by a microcontroller, for example. In the second compensation current protection module B in the ground path, lower voltages, which can either be directly coupled in or converted (to a lower voltage) once again by an internal voltage transformer (DC/DC). Other implementations are also conceivable here.

In order to decouple the power MOSFETs from each other even in the event of short circuits, each gate of the same is decoupled from the gate voltage supply by a switch of the gate control line and, if necessary, by an optional additional diode 9. In addition, the three separate control inputs STRG_1 to STRG_3 offer the option of individually controlling the power MOSFETs by a microcontroller. If lower safety requirements are sufficient, some or all of the control inputs STRG_1 to STRG_3 can be connected and switched jointly.

For better clarity, additional test and diagnostic circuits are not shown. However, in a practical design, they may be provided and arranged for both the first and second compensation current protection modules A and B as well as for the high-side and low-side drivers at the outputs of the solenoid valves 5 to provide sufficient diagnostic coverage of the switches 6, the compensation current protection and the reverse polarity protection.

Figure 6:
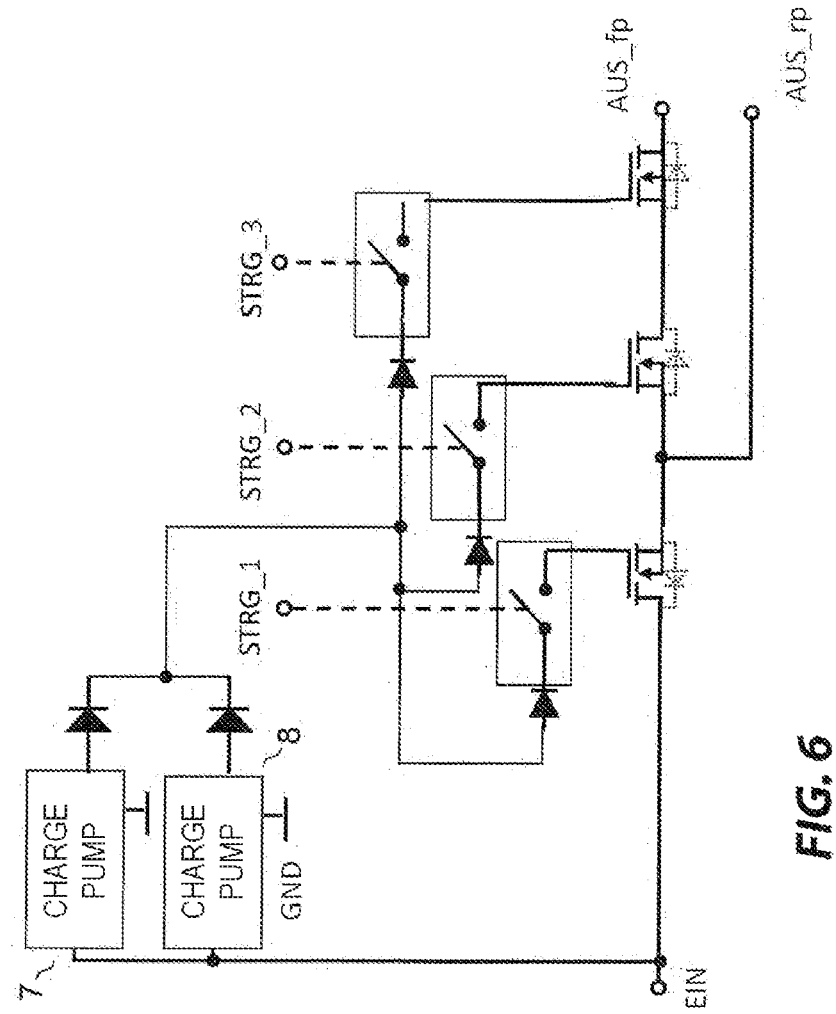
FIG. 6 shows details of a modification of the exemplary first compensation current protection module A according to FIG. 3 in an extended configuration level for the protection of the positive supply path with increased safety measures.
Figure 6:
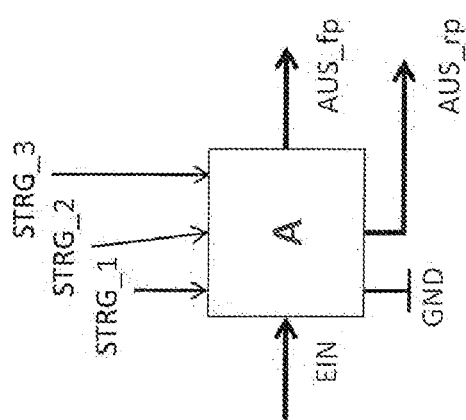

FIG. 6 shows details of a modification of the exemplary first compensation current protection module A according to FIG. 3 or FIG. 4 in a modification as an extended configuration level with increased safety measures, in which an additional redundant charge pump 8 for protecting the positive supply path is arranged and configured to provide protection against failures due to a single fault in the internal charge pump 7.

Figure 7:
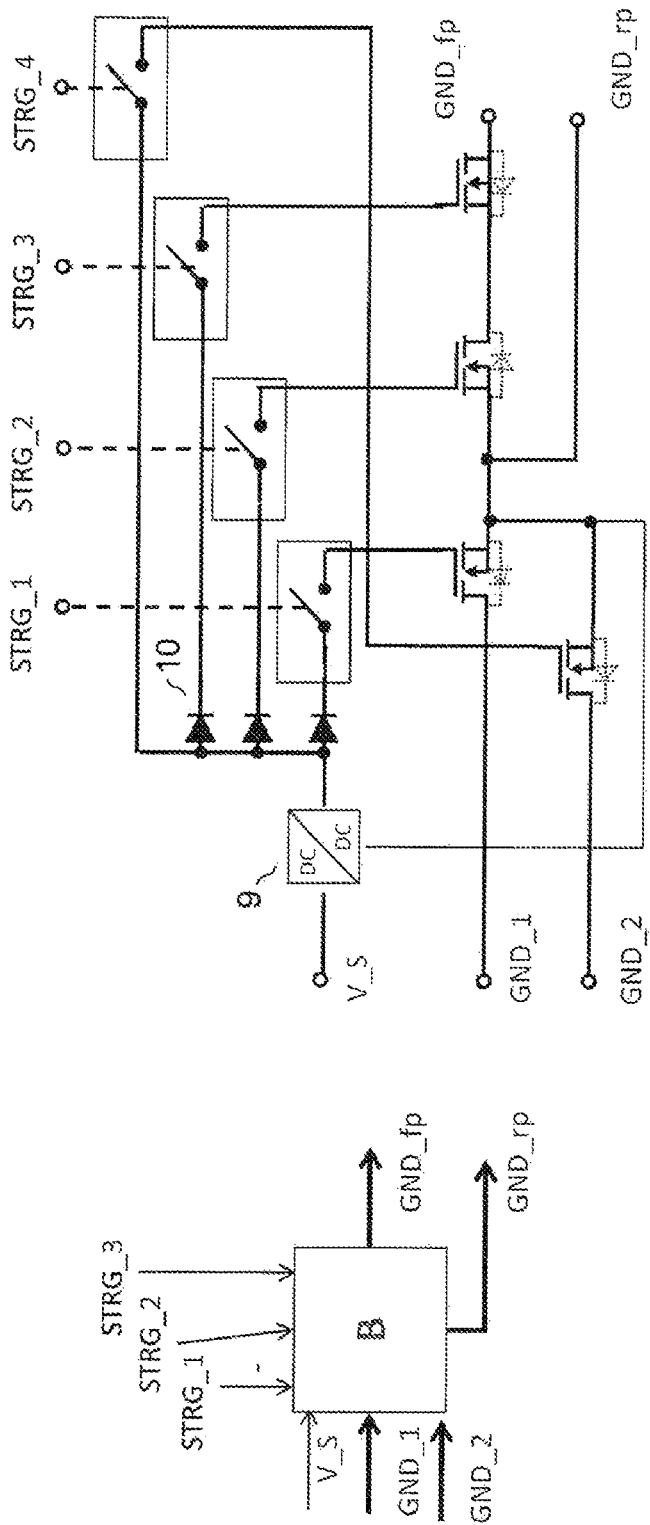
FIG. 7 shows details of a modification of the exemplary second compensation current protection module B according to FIG. 3 in an extended configuration level with exemplary additional safety measures.

FIG. 7 shows details of a modification of the exemplary second compensation current protection module B according to FIG. 3 in an extended configuration level with exemplary additional safety measures in multiple available control unit supply and/or ground pins. According to this modification, if a voltage offset between a ground input GND_1 and a ground input GND_2 is below the diode forward voltage of the diode 9, a redundant ground input can be configured to provide protection against a line dropout, for example.

The configuration levels of the first and second compensation current protection modules A and B, shown as modifications in FIGS. 6 and 7, provide even more extensive protection against various fault cases.

Thus, according to FIG. 6, additional protection against possible individual faults in the internal charge pump 7 can be achieved by the arrangement of a plurality of separate charge pumps 7.

In addition, if multiple supply or ground pins are available on the first and second control units 1, 2, the first and second compensation current modules A or B can be controlled with redundant inputs. This provides protection against an open circuit on a pin or against a fuse being tripped in one of the control unit supply paths. FIG. 7 shows an example of a circuit arrangement for the second compensation current protection module B with two control unit ground pins. In the circuit arrangement in FIG. 7, it should be ensured that the voltage offset between the two control unit ground pins is below the forward voltage of the body diode of the power MOSFET. If higher voltage offsets are expected, this can be achieved by additional measures, e.g. additional MOSFETs.

Figure 8:
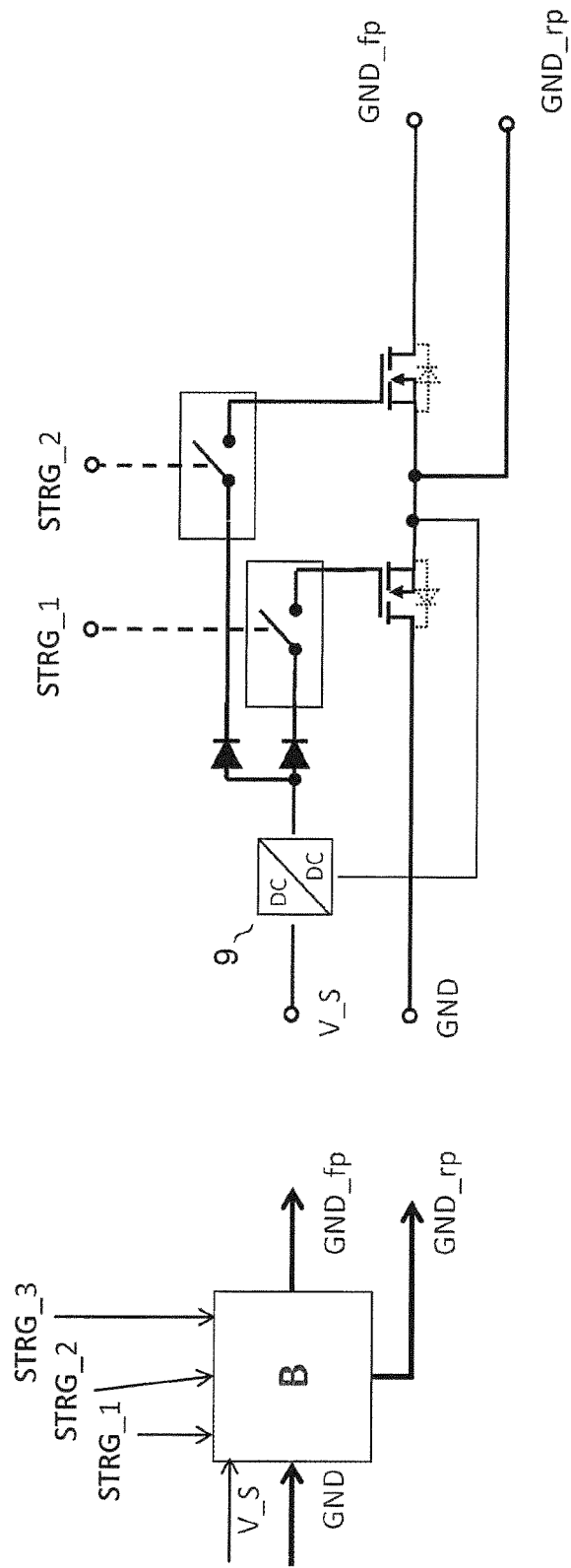
FIG. 8 shows details of a further modification of the exemplary second compensation current protection module B in a simplified configuration level.

FIG. 8 shows details of a further modification of the exemplary second compensation current protection module B according to FIG. 3 in a simplified configuration level. This configuration level is equipped with only two MOSFETs, provides protection against reverse polarity and decouples the output with respect to ground, provided not all module-internal switches are closed.

As described above, in the case of an air brake system of the kind described here, it must be ensured that a fault in one of the control circuits does not, if possible, adversely affect another control circuit. The compensation current protection modules A, B described above will then protect against faults induced by unwanted compensation currents.

Second Exemplary Embodiment

In a second exemplary embodiment, diodes are inexpensive and simple replacements for MOSFETs. The second exemplary embodiment can thus represent an embodiment that optimizes and simplifies the first exemplary embodiment. Replacing MOSFETs with diodes eliminates at least the need to measure voltage and current signals for monitoring and the control of each of the affected MOSFETs, resulting in less hardware and software overhead. In addition, and more cost-effectively and simply, at least one diode can be arranged externally to the control unit, i.e. outside a control unit or control device, for example, one integrated in a cable set or in an actuator such as a pressure control valve (PCV).

According to the second exemplary embodiment, diodes or functionally equivalent components or elements are arranged in electronic control units, in a wiring harness (for example, in plugs or plug sockets of pressure control valves or electronic control units) and/or in a special T-piece, for example. During fault-free operation, specifically only one of the electronic control units performs the control of the pressure control valves. In all electronic control units, both the positive and the ground lines are blocked unless a solenoid valve is to be supplied with current.

Figure 9:
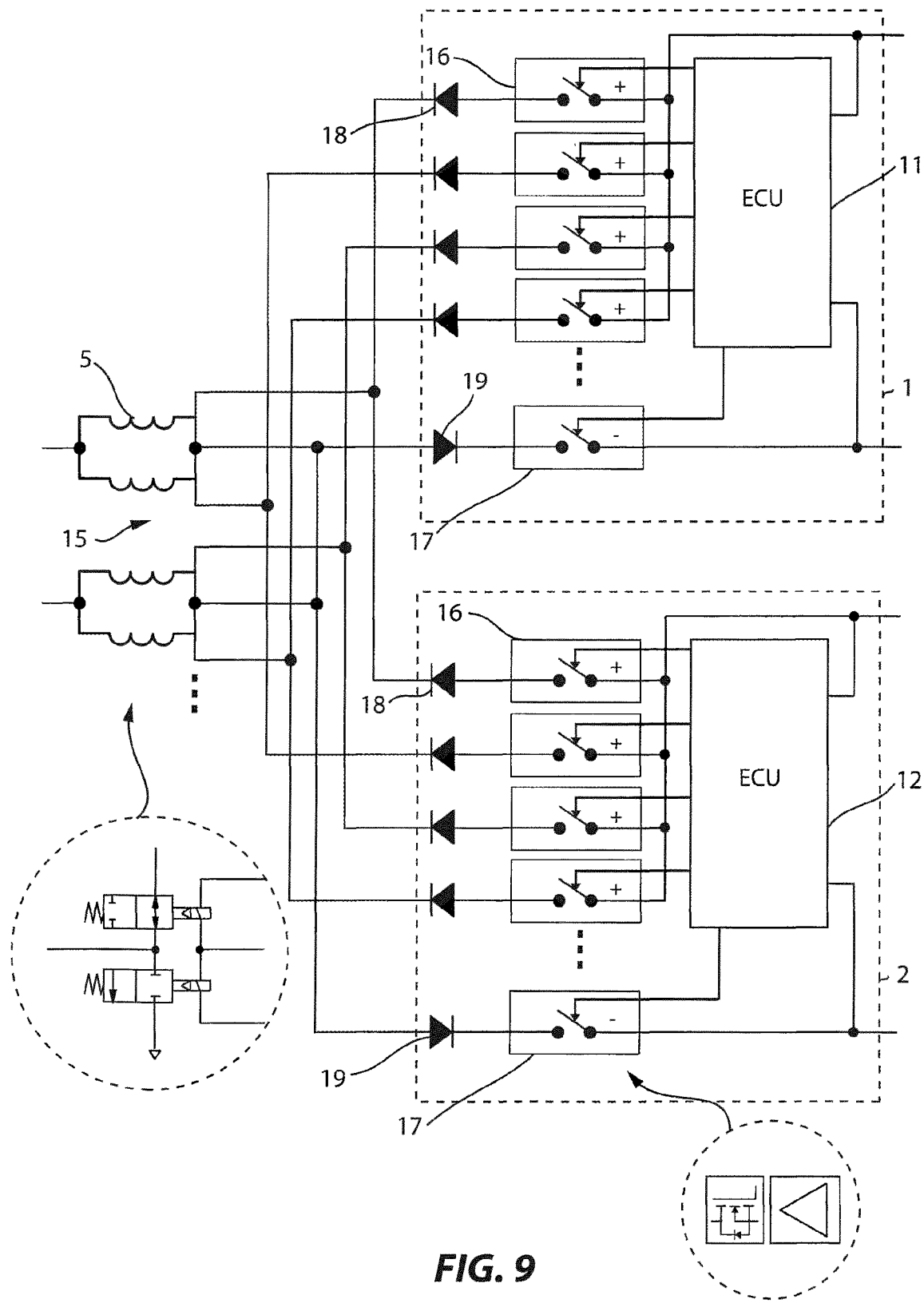
FIG. 9 shows a simplified representation with details of a redundantly configured compressed-air braking system with arrangement of a current blocking device according to a second exemplary embodiment.

As shown in FIG. 9, according to the second exemplary embodiment, an electro-pneumatic actuator, e.g. a pressure control valve 15, consists electrically of two solenoid valves 5, having a common and a separate connection each. A first controlling electronic control unit or ECU 11 and a second controlling electronic control unit or ECU 12 each have a switching device 16 for switching the common connections of all solenoid valves 5 and one switching device 17 each for each solenoid valve 5 for supplying their current individually. The switching devices 16, 17 can be configured, for example, as electronic output stages which are controlled by a logic unit (not shown) in the first electronic control unit 11 and the second electronic control unit 12.

A distinction is made here between output stages which connect the supply leads of the solenoid valves 5 to positive (+) (high side), and output stages which connect the return leads of the solenoid valves 5 to negative (−) or ground (low side). An output stage that jointly switches one of the two paths for a plurality of solenoid valves 5 can be a high-side output stage or low-side output stage (common ground). In the following description, a negative connection (low side) is conveniently assumed.

A two-sided shutdown option is necessary to prevent unwanted supply of current to a solenoid valve 5 even in the event of a short-circuit of one of the supply leads to the supply voltage or the ground, or due to a short-circuited output stage. Furthermore, in order to detect other fault cases in a timely manner, in particular short-circuits between a supply and a return lead, short-circuits between a return lead and supply voltage and between return lead and ground, as well as possible cable breakage, electrical values (for example, voltages at the terminals, excessive currents) are permanently monitored and from time to time test pulses are applied to the magnets and the electrical response to them is evaluated.

As shown in FIG. 9, according to the second exemplary embodiment, a diode 18 and a diode 19 are arranged at the respective connection of the switching devices 16 (i.e. the output stages) in the direction of the solenoid valves 5 or their respective connection to the voltage supply or ground.

In the second exemplary embodiment according to FIG. 9, the diodes 18, 19 are arranged within the first and second control units 1, 2, indicated by a broken line.

Figure 10:
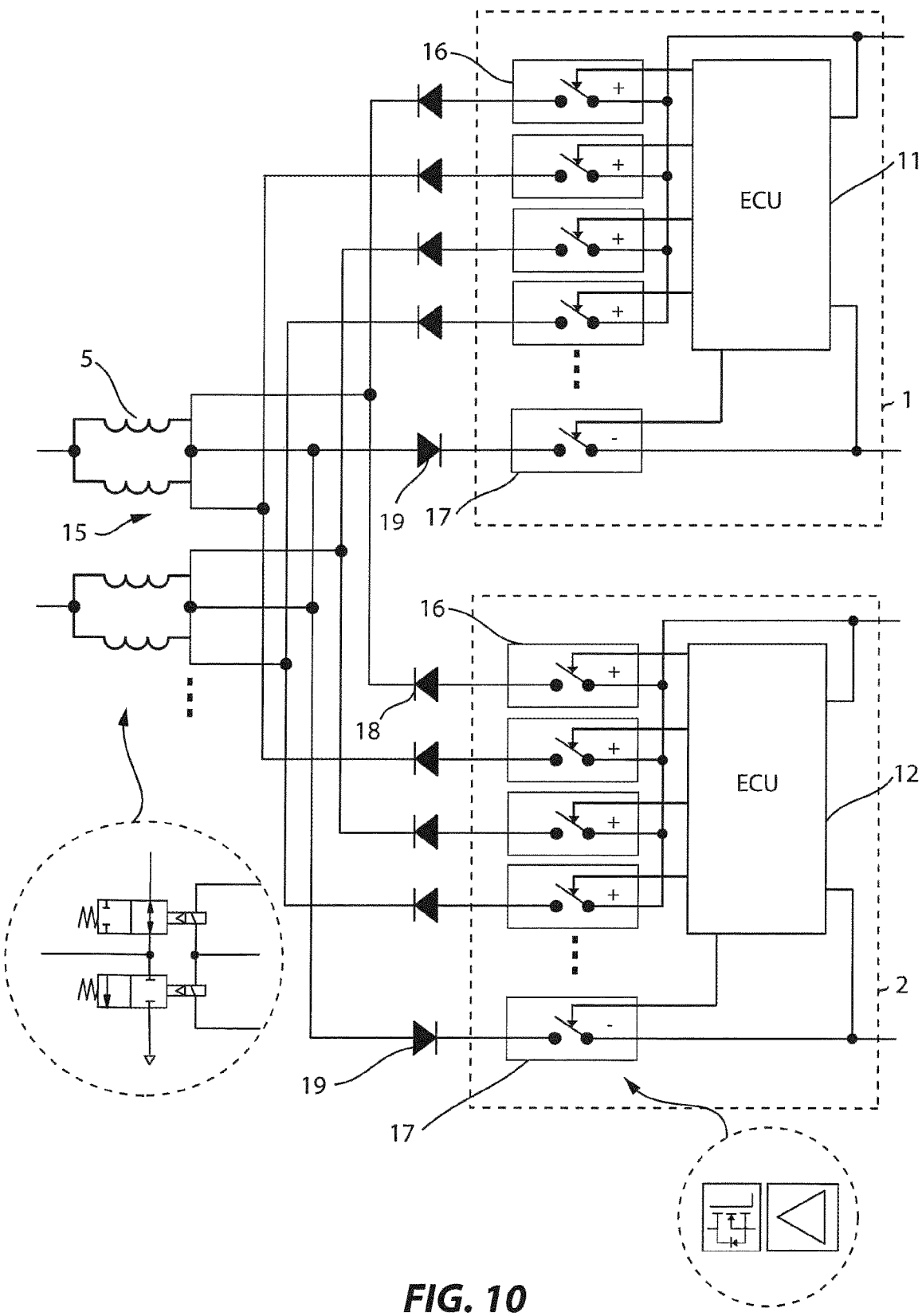
FIG. 10 shows an alternative arrangement of the current blocking device according to FIG. 9.
Figure 11:
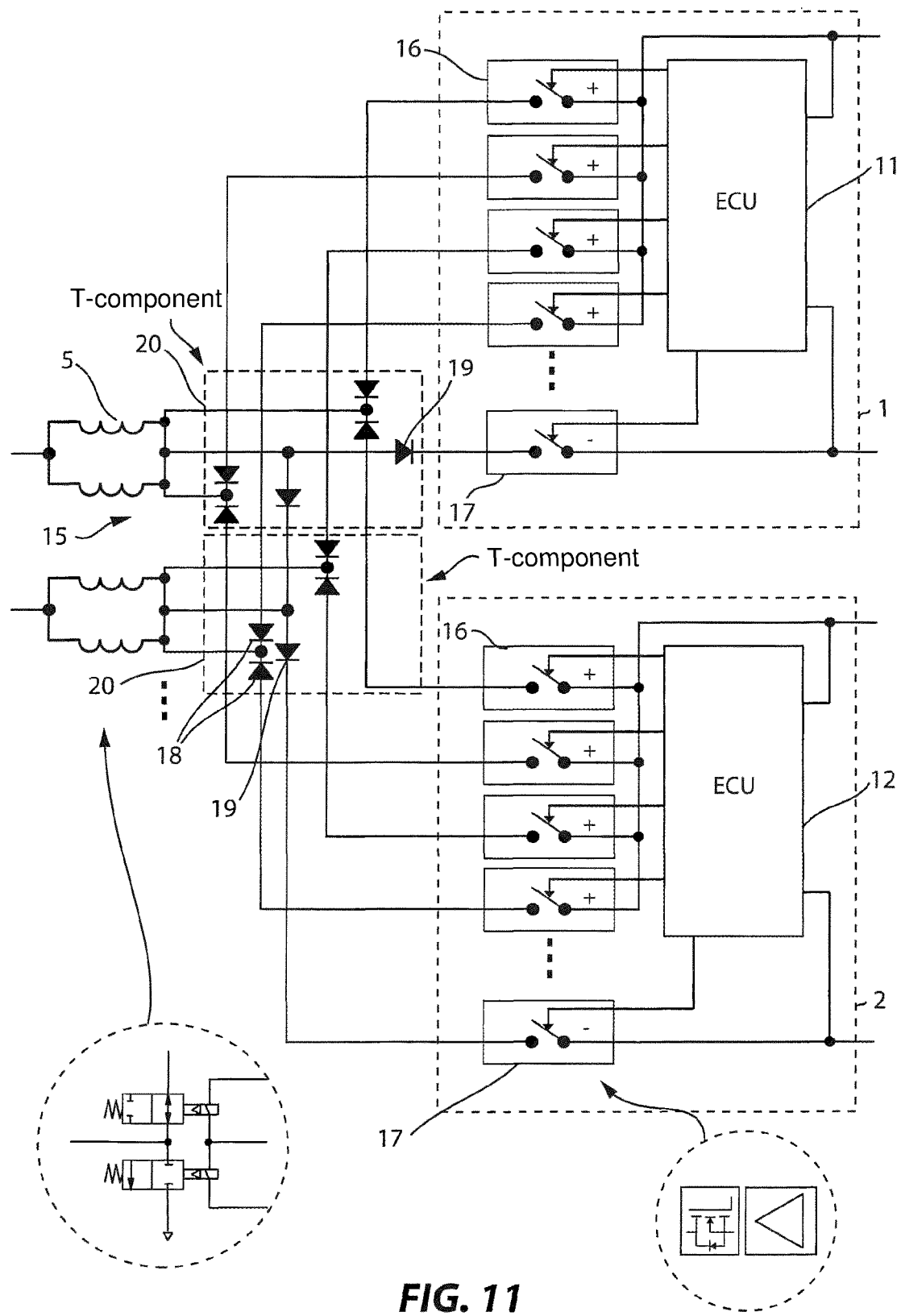
FIG. 11 shows another alternative arrangement of the current blocking device according to FIG. 9.
Figure 12:
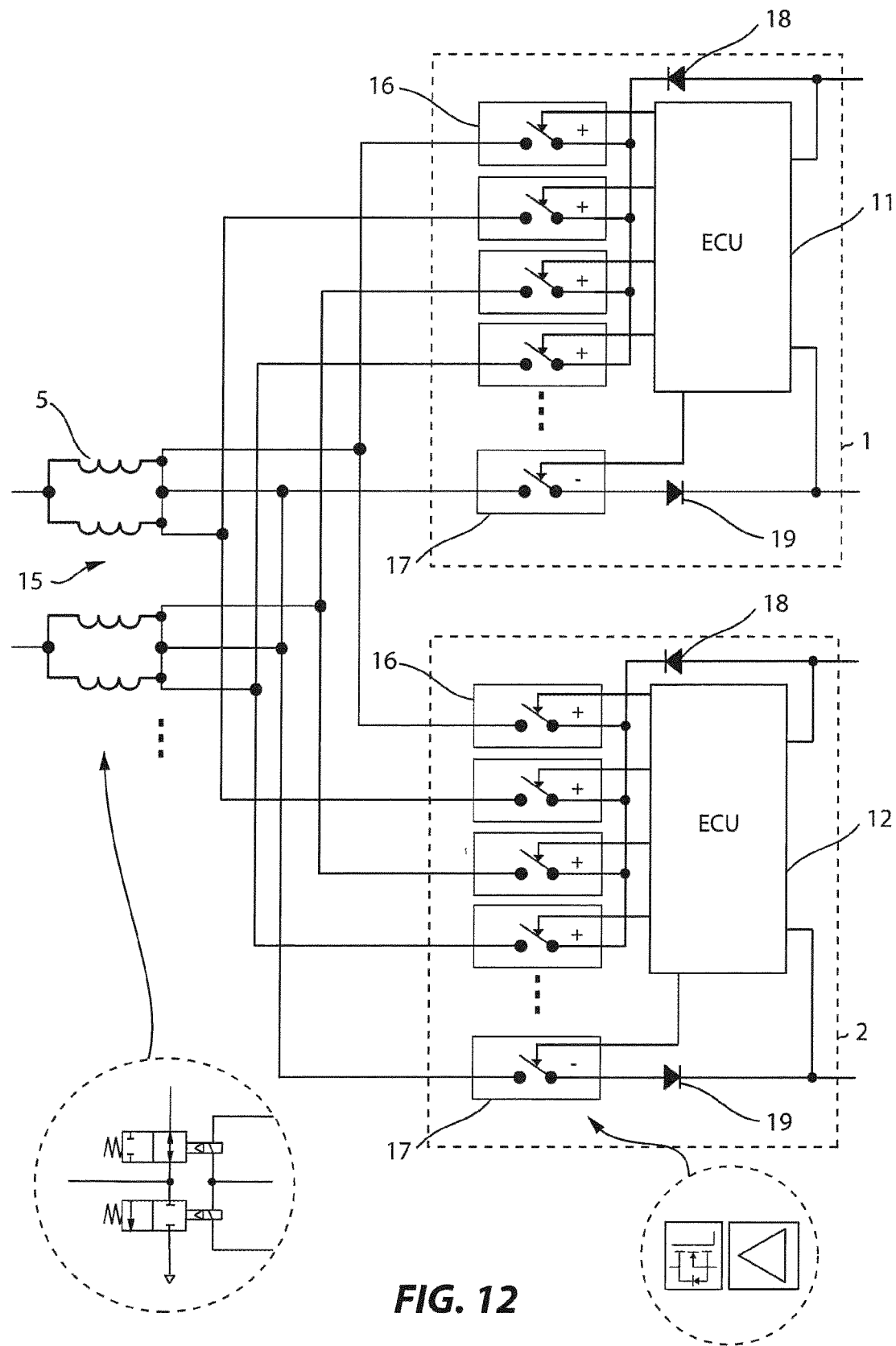
FIG. 12 shows another alternative arrangement of the current blocking device according to FIG. 9.
Figure 13:
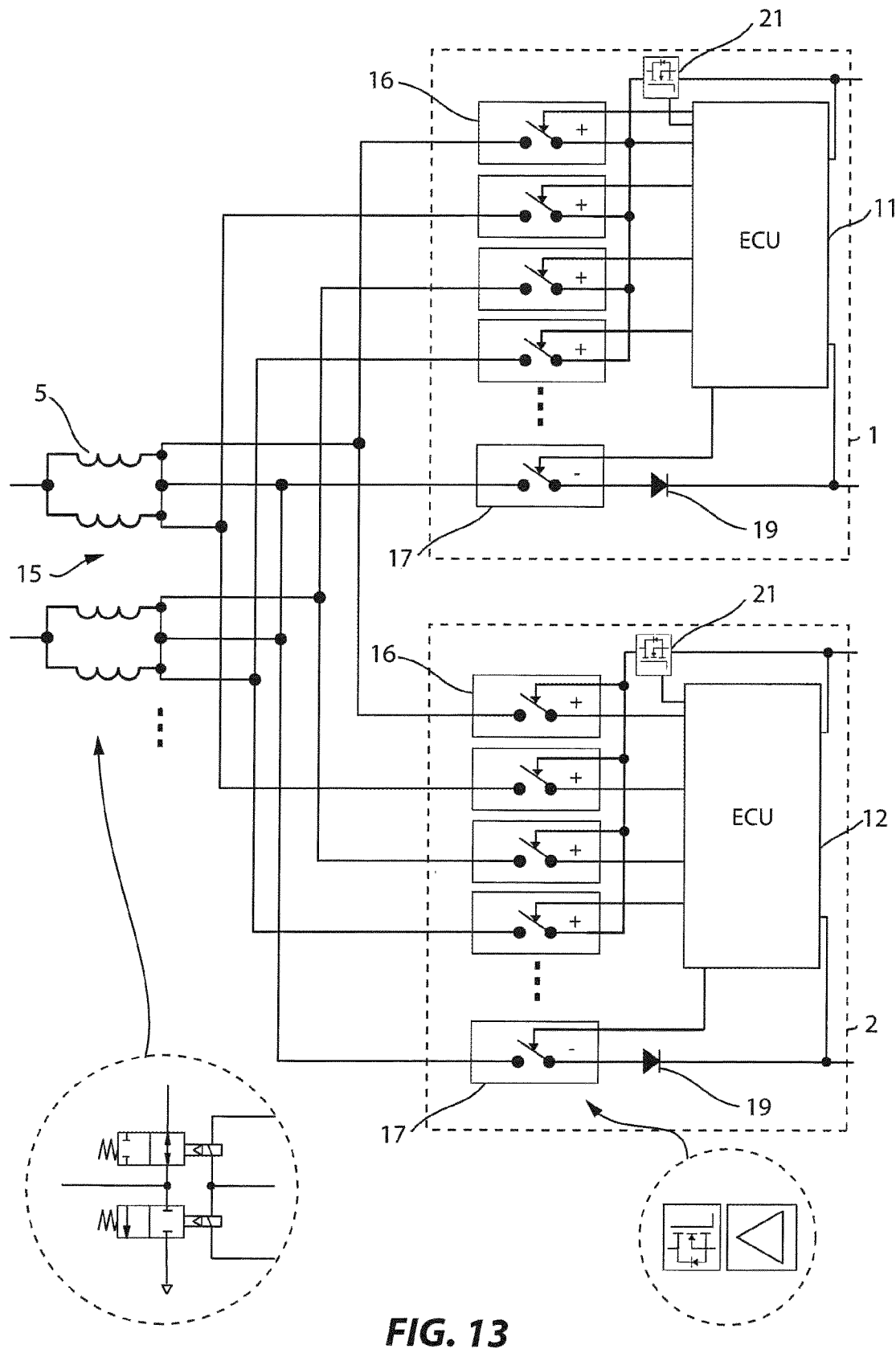
FIG. 13 shows another alternative arrangement of the current blocking device according to FIG. 9.

It should be noted that in corresponding modifications of the second exemplary embodiment, outside the first and second control units 1, 2 (FIG. 10), these diodes 18, 19 can be replaced by a diode circuit arrangement 20 (FIG. 11) operating in an equivalent manner to a single or separately arranged diode in each case, by in each case in a common current path section between the switching devices 16, 17 and in each case the electronic control units 11, 12 (FIG. 12) and/or by an additional, reverse-polarized and actively switched output stage 21 in conjunction with a diode 19 (FIG. 13). In the latter modification, it is additionally conceivable to also replace the diode 19 by an corresponding additional actively switched output stage.

The diodes 18, 19, the circuit arrangement 20 operating equivalent to a single diode and/or by an additional, reverse-polarized and actively connected output stage 21, are configured to prevent a current from flowing in an undesirable or unintended direction via the connecting line to the pressure control valve 15 into the electronic control units 11, 12 in the event of a fault and causing damage due to connections to the other electronic parts of the electronic control units 11,12.

This will advantageously prevent a situation where, if both electrical circuits have a common ground (−), a ground offset between the two controlling electronic control units 11, 12 could lead to the destruction of one or both of the electronic control units 11, 12, and where a defective electronic control unit 11, 12 is again unintentionally supplied "backwards", for example, if it is disconnected from its supply voltage due to a fault, or where the current is shorted to the solenoid valve 5 from an intact electronic control unit if a faulty electronic control unit has a short-circuit of its supply to ground, because the parasitic diode of the high-side output stage of the faulty electronic control unit would pass the current from the intact ECU when this intact electronic control unit turns on the solenoid valve 5. In such a fault case, unwanted and potentially dangerous actions could occur in the faulty electronic control unit and the solenoid valve of the pressure control valve 15 in question could be prevented from switching, or the intact electronic control unit could also be destroyed due to the excessive current flow. In such a case, the required redundancy would no longer be provided.

According to the second exemplary embodiment, in both electronic control units 11, 12, both the switching devices 6 or output stages of the positive and the ground lines are always blocked whenever none of the solenoid valves 5 is to be supplied with current. In a fault-free operation, specifically only one of the electronic control units 11, 12 performs the control of the pressure control valves 15. This division of tasks can be maintained during fault-free operation or can change periodically or according to other predetermined criteria, for example, according to criteria that are configured to harmonize the thermal loading of the output stages.

In addition, an electronic control unit in a passive state does not carry out any active supply of current to a solenoid valve 5 for test purposes while it is in the passive state. This prevents the output of test pulses to a magnet and, in an advantageous way, prevents the triggering of the values of a permanent monitoring in another electronic control unit and a resulting, unfounded fault detection.

However, the electronic control unit in a passive state can optionally also monitor the voltage levels and/or current levels on its leads to the pressure control valves 15 in its passive state and, if necessary, check their plausibility using information transmitted to it by the active electronic control unit via a digital interface, e.g. a CAN bus, with regard to the current activation of the solenoid valves. In particular, it is thus possible to monitor the safe blocking of diodes 18, 19, for example, when the diodes 18, 19 are arranged in connections within the electronic control unit as shown in FIG. 9 and FIG. 12.

If a currently active first electronic control unit, such as the first electronic control unit 11, is no longer able for any reason (e.g. after loss of supply voltage, due to an electrical fault within the electronics, e.g. due to a short-circuited output stage, a cable break in a lead to a pressure control valve 15) to control the pressure control valves 15, a hitherto passive, second electronic control unit, for example the second electronic control unit 12, then becomes the active electronic control unit and takes over the control of the pressure control valves 15 from then on, assuming this is still possible. For this purpose, this second electronic control unit 12, which changes from the passive state to the active state, for example, due to failure of communication with or to the first electronic control unit 11, can either detect itself that the previously active first electronic control unit 11 has failed. Alternatively, the previously active first electronic control unit 11, or another electronic control unit that has detected the fault in the previously active first electronic control unit 11, can notify the second electronic control unit 12 of the detected fault.

The second electronic control unit 12, which has now become active, can then detect on the basis of the voltage levels on its leads whether a short-circuit is present or one of the dedicated (individual) output stages in the no longer active first electronic control unit 11 is short-circuited. In these cases, continued operation of the pressure control valves 15 is no longer possible, because switching on the common switching device 17 would immediately and unintentionally activate a solenoid valve 5. The active electronic control unit therefore terminates the operation of the pressure control valves 15 in these cases.

In the absence of any of the above-mentioned fault conditions, i.e. in the absence of a short-circuit or fused output stage, the active electronic control unit can switch on the common switching device 17 and one or more of the dedicated switching devices 16 in a pulsed mode in order to detect a fault due to excessive current flow. A short-circuit to ground or a short-circuited common switching device 16 or output stage of a faulty electronic control unit can be detected by the fact that, when the corresponding dedicated switching device or output stage is switched on in pulsed mode, no voltage is present on the return line in front of the common switching device or output stage when the common switching device or output stage is switched off.

If one of the above faults has been detected, continued operation of the pressure control valve 15 or the pressure control valves 15 is not possible. This is because in the event of a short-circuited output stage for the dedicated supply of a solenoid valve 5 in an electronic control unit it would not be effective if only this electronic control unit switched off the corresponding opposite-polarity, common output stage, since the current would then flow through the opposite-polarity, common output stage of the other electronic control unit and activate the solenoid valve unintentionally. In the above-mentioned fault cases, the now active electronic control unit therefore terminates the operation of the pressure control valve or the pressure control valves.

In the other fault cases of a short-circuit to ground or a short-circuited common output stage of a defective electronic control unit, the operation of the pressure control valves 15 may possibly be continued, at least for a limited period of time, by the active electronic control unit which has taken over the operation of the pressure control valves 15 instead of the defective electronic control unit.

It should be noted that for each detected fault, an appropriate error message may be issued if this has not already been initiated by the faulty electronic control unit or other monitoring system provided and configured for this purpose.

As described above, the invention relates to a device for decoupling and/or protection against compensation currents when at least one electric actuator 5, 15 is used jointly by a plurality of independently voltage-supplied control unit devices 1, 2 in redundant systems for autonomous driving. The electric actuator 5, 15 has, in each case, a common connection, via which the electric actuator can be coupled and switched to a common connection of other electric actuators 5, 15, and has at least one dedicated connection via which the at least one electric actuator 5, 15 can be individually supplied with current. A number of switching devices 6, 16, 17, corresponding to the common connection and the number of dedicated connections of all the electric actuators 5, 15 is arranged to apply or not apply a switched current in the at least one electric actuator 5, 15. The invention provides at least one current flow blocking device A, B, 18, 19, 20, 21, which is configured to prevent an unwanted current flow to a non-active electronic control unit 11, 12 of the first and second control unit devices 1, 2.

The list of reference signs is as follows:
1 first control unit device (first control unit, main control unit)
2 second control unit device (second control unit, backup control unit)
3 first voltage supply
4 second voltage supply
5 solenoid valve
6 switching device (switch, output stage)
7 charge pump
8 charge pump
9 diode
11 first electronic control unit
12 second electronic control unit
15 pressure control valve
16 switching device (switch, output stage)
17 switching device (switch, output stage)
18 diode
19 diode
20 diode circuit arrangement (T-piece)
21 output stage
A first compensation current protection module
B second compensation current protection module
μC microcomputer

The invention claimed is:

1. A device for decoupling and/or protecting against compensation currents when at least one electric actuator is used jointly by a plurality of independently voltage-supplied control unit devices in redundant systems for autonomous driving, comprising:
at least one current flow blocking device, which is configured to prevent a resulting flow of current to an electronic control unit of another of a first control unit device and a second control unit device when one of the first and second control unit devices applies a switched current to the at least one electric actuator;
wherein the at least one electric actuator has, in each case, a common connection, via which the electric actuator can be coupled and switched to a common connection of other electric actuators, and has at least one dedicated connection, via which the at least one electric actuator can be individually supplied with current,
wherein the plurality of control unit devices has at least one first control unit device including a first electronic control unit and a first number of switching devices corresponding to the common connection and the number of dedicated connections of all the electric actuators, and has at least one second control unit device including a second electronic control unit and a second number of switching devices corresponding to the common connection and the number of dedicated connections of all the electric actuators, and
wherein the at least one first and second control unit devices are arranged to apply or not apply a switched current to the at least one electric actuator using the switching devices.

2. The device of claim 1, wherein the first and second control unit devices include a main brake control unit with the first electronic control unit and a backup brake control unit with the second electronic control unit, and the at least one electric actuator includes a solenoid valve or a pressure control module containing solenoid valves, wherein the first and second control unit devices are arranged to jointly access coils of the solenoid valves and of the pressure control modules, the coils being configured to be activated via the switching devices, and wherein the switching devices contain semiconductor switches configured to be supplied via a common supply and ground path.

3. The device of claim 1, wherein the switching devices include electronic output stages, which are arranged to be controlled by a logic unit of the first or second electronic control unit, one output stage in each case being an output stage that connects the supply leads of an electric actuator to a positive potential, or an output stage that connects the return leads of the electric actuator to a negative potential or ground potential.

4. The device of claim 1, wherein the current flow blocking device includes a first compensation current protection module and a second compensation current protection module, which are each configured as a switching semiconductor circuit module and configured to be connected into a positive path and a ground path and to prevent compensation currents between voltage supplies through the control unit devices.

5. The device of claim 4, wherein the first compensation current protection module has-one input, three separate control inputs for controlling internal control switches in a metal-oxide-semiconductor field-effect-transistor (MOSFET) gate controller of switching MOSFETs in the module, and wherein the first compensation current protection module has-a fully protected output, an output providing reverse-polarity protection, a ground connection and a charge pump, wherein gate control leads are configured to be decoupled from each other to protect against failures due to individual short-circuit faults of the MOSFETs.

6. The device of claim 5, wherein in the first and second compensation current protection modules the orientation of the MOSFETs is determined module-internally by the orientation of the MOSFETs in downstream high-side and low-side drivers of drivers for the at least one electric actuator, and the interconnection of the MOSFETs of the first and second compensation current protection modules is such that two body diodes of two respective MOSFETs are connected in opposite directions and provide direct protection against reverse currents, and a third MOSFET of the first and second compensation current protection modules is oriented so that it provides a redundant reverse current protection.

7. The device of claim 4, wherein the second compensation current protection module has one input, three separate control inputs for controlling internal control switches in a MOSFET gate controller of switching MOSFETs in the module, a fully protected output, an output providing reverse-polarity protection and a ground connection, wherein the gate control lines are decoupled from each other to protect against failures due to individual short-circuit faults of the MOSFETs.

8. The device of claim 1, wherein the current flow blocking device includes a diode arranged on a terminal of each of the switching devices.

9. The device of claim 8, wherein the diode is arranged inside the first and second control units or outside the first and second control units.

10. The device of claim 8, wherein a plurality of diodes are arranged in a diode circuit arrangement forming a T-piece which operates equivalent to a single diode.

11. The device of claim 1, wherein a diode is arranged in a common current path section between the switching devices and each of the electronic control units as the current flow blocking device.

12. The device of claim 1, wherein on the supply-potential side a reverse-polarized and actively switched output stage is arranged in a common current path section between the switching devices and the first and second electronic control unit as the current blocking device, and on the ground-potential side a diode is arranged in a common current path section between the switching devices and the first and second electronic control unit as the current blocking device.

13. The device of claim 1, wherein on the supply-potential side a reverse-polarized and actively switched output stage is arranged in a common current path section between the switching devices and the first and second electronic control unit as the current blocking device, and on the ground-potential side a reverse-polarized and actively switched output stage is arranged in a common current path section between the switching devices and the first and second electronic control unit as the current blocking device.

14. The device of claim 1, wherein:
the first and second electronic control units are configured to block the switching devices of both a positive and a ground line if no electric actuator is to be supplied with current,
in a fault-free operation in accordance with predetermined criteria, specifically only one of the first and second electronic control units performs the control of at least one electric actuator,
an electronic control unit of the first and second electronic control units in a passive state is configured not to carry out an active supply of current to an electric actuator for testing purposes,
the electronic control unit in the passive state is configured to switch to an active state in the event of a fault in an active control unit of the first and second electronic control units that prevents further operation of the active control unit and, as a new active electronic control unit to assume the control of the electric actuator instead of the faulty electronic control unit from then on, and
the electronic control unit in the passive state is configured to monitor voltage levels on its leads to at least one electric actuator, to plausibility-check this monitoring with information transmitted to it by the active electronic control unit regarding a current activation of the at least one electric actuator, and to monitor a safe blocking of the current blocking device.

* * * * *